Jan. 5, 1932. G. C. MAXWELL 1,839,691
LINE FASTENER
Filed May 30, 1930
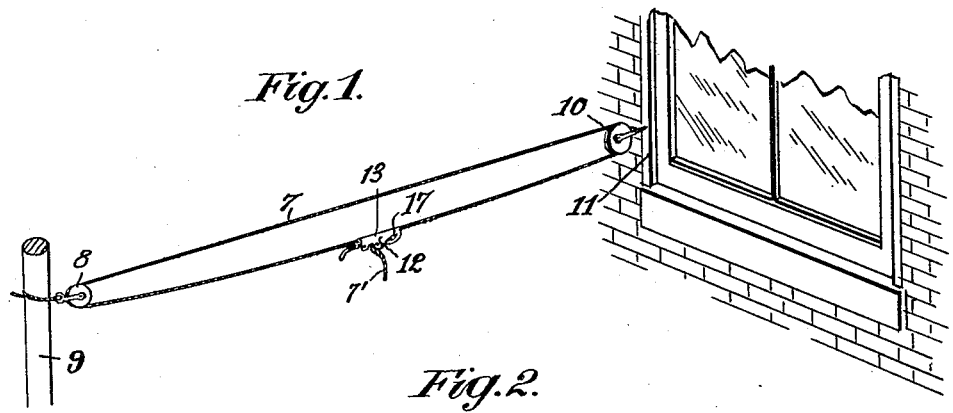
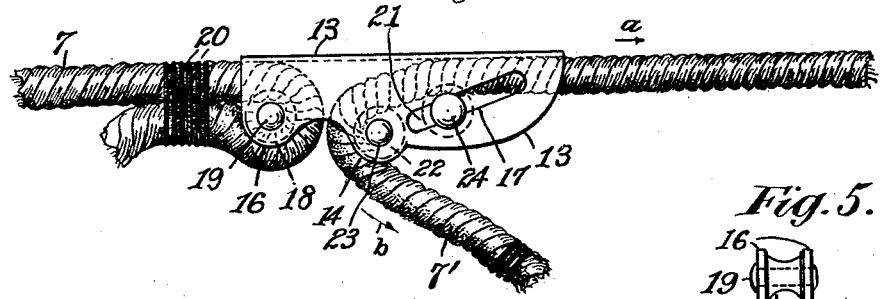
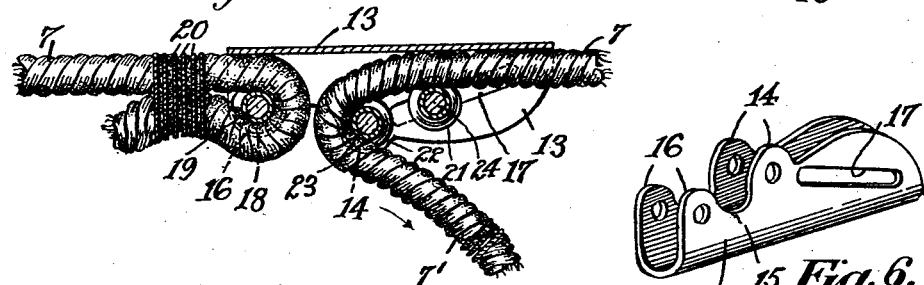
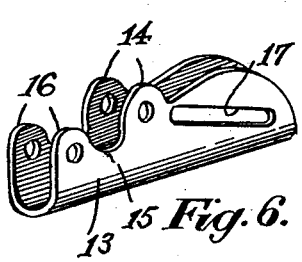
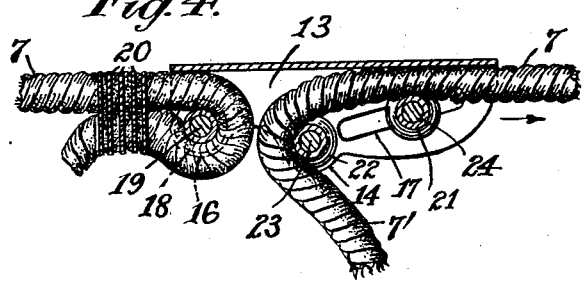
Inventor.
G. C. Maxwell
By John O. Seifert
Attorney Patented Jan. 5, 1932

1,839,691

UNITED STATES PATENT OFFICE

GROVER CLEVELAND MAXWELL, OF MASPETH, NEW YORK, ASSIGNOR TO HELEN SOWINSKI, OF MASPETH, NEW YORK

LINE FASTENER

Application filed May 30, 1930. Serial No. 457,644.

This invention relates to means for fastening a line, such as a pulley clothes line, and it is the object of the invention to provide an improved fastener means for this purpose which is automatically operative to release the line from the fastener when a force is exerted thereon in the action of drawing the line to taut condition, and automatically operative upon relieving the line of the pulling force to secure the line in its taut condition, and readily manipulable to release the same from the line when it is desired to slacken the line, and to provide fastener means for this purpose which is simple and cheap in construction and efficient in use.

In the drawings accompanying and forming a part of this application Figure 1 is a perspective view of a pulley clothes line showing the embodiment of my invention applied thereto.

Figure 2 is a side elevation of my improved line fastening means showing the same in connection with the opposite ends of a line and in released condition in the action of drawing the line to taut condition.

Figure 3 is a longitudinal sectional view showing the parts in the condition shown in Figure 2.

Figure 4 is a view similar to Figure 3 but showing the fastener means in condition to secure the ends of the line together.

Figure 5 is an end elevation as viewed from the left in Figure 1 but inverted; and Figure 6 is a perspective view of the body of the fastener.

While the invention is particularly applicable to securing together of lines, cables or wires, I have shown one embodiment thereof in connection with a pulley clothes line, wherein the line 7 is looped around a pulley 8 mounted on a pole 9 and a pulley 10 mounted on a window frame 11, with the ends of the line fastened together by my improved fastener means, shown in a general way at 12 in Figure 1.

In carrying out the invention there is provided a body 13 formed from a stamped sheet metal blank by folding the same longitudinally upon itself to channel shape in cross section with the connecting portion in the arc of a circle, as shown in Figure 6, the blank being shaped so as to form the same with opposite perforated ears 14 at the marginal portions of the channel legs and intermediate the ends of the body. The channel legs intermediate one end of the body and the ears 14 is cut away or recessed, as at 15, for a purpose hereinafter described, and arranging the body at the one end with a further pair of parallel perforated ears 16. The channel legs at the opposite side of the intermediate ears 14 are arranged with opposite parallel slots 17 inclining downward from the end and adjacent to the connecting portion of the body and toward the ears 14.

A roller or bushing 18, the periphery of which is of arcuate shape in cross section, is rotatably supported on a pin 19 extending transversely between and secured in the perforations of the ears 16, and to which roller or bushing one end of the line is fixed or anchored by inserting the end of the line between said bushing and the connecting portion of the channel legs of the body 13 and extended through the space between the ears 16, 14 formed by the cut away portions 15, the end of the line being looped around the roller or bushing 18 and secured in said position, as by arranging the said end in parallel relation with the body of the line and binding cord or wire around the same, as at 20.

The opposite end of the line looped around the pulley 10 is inserted between the connecting portion of the channel legs of the body and a pair of rollers 21, 22 having the periphery also formed to arcuate shape in cross section similar to the roller 18 and extended through the space 15 between the ears 14, 16. The roller 22, which is in the nature of a lead off guide for the one end of the line, is rotatably supported on a pin 23 extending transversely between the channel legs and mounted in the perforations of ears 14. The roller 21 is rotatably mounted on a pin 24 extending transversely between the channel legs and loosely engaging in the slots 17 to have sliding movement therein, the pin being arranged with enlargements or heads at the opposite ends to prevent lateral displacement of the pin from the slots.

The one end of the line is looped over the roller 18 and permanently secured thereto by the binding 20 as described, and the opposite end of the line is secured by clamping the same between the roller 21, and the connecting portion of the channel legs of the body, which is effected by the movement of the line in the direction indicated by the arrow *a* and when in such condition any force applied to the line will operate to cause the roller carrying pin 24 to move up the slots 17 and forcibly impinge or clamp the line between the roller 21 and said connecting portion of the channel legs, and this is effected whether the force is applied through the connection of the line with the pin 19, or to the opposite end of the line in the direction of the arrow *a*. Assuming the line is loose and it is desired to tighten the same, the end of the line 7' being secured by the roller 21 clamping it to the connecting portion of the channel legs of the body, all that is necessary to tighten the line is to grasp the end of the line 7' and exert a pull thereon in the direction of the arrow *b*, which during the initial movement of the line will effect a movement of the roller supporting pin 24 downward in the slots 17 toward the roller 22 due to the frictional contact of the line with the roller 21 and release the line, as shown in Figure 3. Instantly upon relieving the end of the line of the pulling force there is a movement of the line effected in the direction of the arrow *a* and by the frictional contact of the line with the roller 21 the roller carrying pin 24 is caused to ride up the slot 17 impinging the roller against the line and the line against the connecting portion of the channel legs thereby firmly securing the same. It will be noted that the axis of the roller carrying pin 24 in all positions thereof in the slots 17 is in a plane above the axis of the roller carrying pin 23, and thus assuring contact of the line with the roller 21 in all positions thereof and releasing movement of the roller 21 when a pull is exerted on the line in the direction of the arrow *b*, and a movement of such line in a downward direction in the slots by a movement of the line in the direction indicated by the arrow *a*. Furthermore, the axis of the roller carrying pin 19 is also in a plane above the axis of the pin 23. By the arrangement of inserting the ends of the line between the connecting portion of the channel legs and the rollers 18, 21 the ends of the line are arranged in alinement with the result that there will be a lineal pull on the body and any longitudinal stresses on the line laterally or outwardly from the body will tend to effect a more firm clamping of the line by the roller 21.

Having thus described my invention, I claim:

1. In a line fastener, a body of channel shape in cross section, a member extending between the marginal portion of and secured in the channel legs at one end of the body to which member one end of a line is adapted to be permanently anchored with the line engaged between said member and the leg connecting portion of the channel member, parallel slots in the channel legs extending inward from the opposite end of the body and inclining in a direction from the connecting portion to the marginal portion of the channel legs to a point intermediate the ends of the body, a line clamp comprising a pin extending between the channel legs and slidably engaging in the slots and a roller rotatable on the pin having a periphery of arcuate shape in cross section between which roller and the leg connecting wall of the channel body the line is adapted to be clamped to extend in alinement with the line connected to the anchoring pin, whereby the ends of the line are adapted to exert opposite straight line forces and effect a clamping of the line between the clamping roller and leg connecting portion of the body, a pin extending between a marginal portion of and secured in the channel legs in interposed relation to the line anchor and clamp roller, and a line guiding roller rotatable on said pin and between which line guiding and clamping rollers and the leg connecting portion of the channel the other end of the line is adapted to engage, and said end of the line by a movement thereof in one direction is adapted to be clamped between the line clamping roller and the leg connecting portion of the body, and by a pulling force exerted on said end of the line effect unclamping movement of the clamping roller.

2. A line fastener as claimed in claim 1, wherein the marginal portions of the channel legs of the body are recessed intermediate the one end and midway of the body to arrange the channel legs with ears at one end in which the line anchoring member is mounted and ears intermediate the ends of the body in which the pin carrying line guiding roller is mounted with the line guiding roller positioned in a plane outward from the plane of the line anchoring member and the marginal portion of the channel legs of the channel member intermediate the ears to permit of ready passage of the line ends.

Signed at the city of New York, in the county of New York and State of New York, this 22nd day of May, 1930.

GROVER CLEVELAND MAXWELL.